(12) United States Patent
Das et al.

(10) Patent No.: US 12,339,854 B1
(45) Date of Patent: Jun. 24, 2025

(54) USING PATTERN-BASED RESULT TABLES TO SPEED UP SPARQL QUERIES ON RDF GRAPH SETS

(71) Applicant: Oracle International Corporation, Redwood Shores, CA (US)

(72) Inventors: Souripriya Das, Nashua, NH (US); Daniel Diaz Lopez, Jalisco (MX); Matthew Steven Perry, Brookline, NH (US); Eugene Inseok Chong, Concord, MA (US); Ruben Alejandro Gonzalez Yanez, Jalisco (MX)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/427,043

(22) Filed: Jan. 30, 2024

(51) Int. Cl.
*G06F 16/2455* (2019.01)
*G06F 16/2453* (2019.01)

(52) U.S. Cl.
CPC .... *G06F 16/24561* (2019.01); *G06F 16/2453* (2019.01)

(58) Field of Classification Search
CPC .............. G06F 16/24561; G06F 16/2453
See application file for complete search history.

(56) References Cited

U.S. PATENT DOCUMENTS

| | | | |
|---|---|---|---|
| 7,979,455 B2 * | 7/2011 | Krishnamoorthy | G06F 16/24522 707/763 |
| 10,346,401 B2 * | 7/2019 | Abolhassani | G06F 16/24549 |
| 11,822,531 B2 | 11/2023 | Das et al. | |
| 2009/0138437 A1 * | 5/2009 | Krishnamoorthy | G06F 16/24534 |
| 2013/0318070 A1 * | 11/2013 | Wu | G06F 16/256 707/E17.14 |
| 2014/0297675 A1 * | 10/2014 | Bhatia | G06F 16/24522 707/760 |
| 2016/0371355 A1 * | 12/2016 | Massari | G06F 16/25 |
| 2017/0357653 A1 * | 12/2017 | Bicer | G06F 16/2365 |
| 2018/0314737 A1 | 11/2018 | Chong | |
| 2023/0177037 A1 | 6/2023 | Das et al. | |
| 2023/0185810 A1 * | 6/2023 | Dekoker | G06N 5/046 707/773 |
| 2023/0195725 A1 * | 6/2023 | Labbate | G06F 16/80 707/715 |

OTHER PUBLICATIONS

Singh et al., "Efficient RDF Dictionaries with B+ Trees", Data Science and Management of Data, NY, availabe: https:// doi.org/10.1 145/3152494.3152506, Jan. 11, 2018, 9 pages.

* cited by examiner

*Primary Examiner* — Kris E Mackes
(74) *Attorney, Agent, or Firm* — Hickman Becker Bingham Ledesma LLP

(57) ABSTRACT

Techniques are provided for generating and maintaining Precomputed Result Tables ("PRTs") that are used by a database server to improve performance of SPARQL queries that target an RDF graph set. Each PRT corresponds to a particular pattern, which may be simple-triple, star, or chain. The techniques support the creation of PRTs for chain patterns that contain multiple instances of the same property, and PRTs for star and chain patterns that include reverse properties. Techniques are also described for maintaining such PRTs as Data Manipulation Language (DML) operations make changes to the RDF graph tables that belong to the RDF graph set associated with the PRTs.

29 Claims, 14 Drawing Sheets

Database 400

RelationsTable 410

:beth :motherOf :sue .
:sue :motherOf :rick .
:dan :fatherOf :rick .
:bob :fatherOf :dan .

Beth Table 412

:beth :fname"Elizabeth" .
:beth :lname"Cooper" .
:beth :motherOf :sue .

Sue Table 414

:sue :fname"Susan" .
:sue :lname"Cooper" .
:sue :motherOf :rick .
:rick :lname"Smith" .
:rick :plays :soccer .

Rick Table 416

:rick :fname"Richard" .
:rick :lname"Smith" .
:rick :plays :soccer .
:rick :plays :baseball .

Dan Table 418

:dan :fname"Daniel" .
:dan :lname"Smith" .
:dan :plays :tennis .
:dan :fatherOf :rick .

Bob Table 420

:bob :fname"Robert" .
:bob :lname"Smith" .
:bob :plays :golf .
:bob :fatherOf :dan .

FIG. 4

Star Table: for pattern → { ?x :fname ?fnm . ?x :lname ?lnm . ?x ^:fatherOf ?dad . ?x ^:motherOf ?mom }

RT_star TABLE
600

| start node (?x) | P<:fname> (?fnm) | C<:fname> | P<:lname> (?lnm) | C<:lname> | R<:fatherOf> (?dad) | C<:fatherOf> | R<:motherOf> (?mom) | C<:motherOf> |
|---|---|---|---|---|---|---|---|---|
| :beth | Elizabeth | 1 | Cooper | 1 | | | | |
| :sue | Susan | 1 | Cooper | 1 | | | :beth | 2 |
| :rick | Richard | 1 | Smith | 2 | :dan | 2 | :sue | 2 |
| :dan | Daniel | 1 | Smith | 1 | :bob | 2 | | |
| :bob | Robert | 1 | Smith | 1 | | | | |

FIG. 6

RT_chain TABLE
700

Chain Table: for pattern → { ?gma :motherOf ?mom . ?mom :motherOf ?kid . ?kid ^:fatherOf ?dad . ?dad ^:fatherOf ?gpa }

| start node (?gma) | P<:motherOf> (?mom) | C<:motherOf> | P<:motherOf>#2 (?kid) | C<:motherOf>#2 | R<:fatherOf> (?dad) | C<:fatherOf> | R<:fatherOf>#2 (?dad) | C<:fatherOf>#2 |
|---|---|---|---|---|---|---|---|---|
| :beth | :sue | 2 | :rick | 2 | :dan | 2 | :bob | 2 |

FIG. 7

USING PATTERN-BASED RESULT TABLES TO SPEED UP SPARQL QUERIES ON RDF GRAPH SETS

FIELD OF THE INVENTION

The present invention relates to database systems and, more specifically, to using pattern-based result tables to speed up SPARQL queries on RDF graph sets.

BACKGROUND

Resource Definition Framework (RDF) is a framework for representing relationships between "resources". The resources may be, for example, data that is interconnected on the web. RDF statements express relationships between resources, such as documents, physical objects, people, concepts, data objects, etc. A collection of RDF statements constitutes a directed graph, where the nodes of the directed graph are resources and the edges are relationships between the resources that the edges connect. Additional information about RDF may be found at https://www.w3.org/TR/rdf11-concepts/RDF/, the entire content of which is incorporated herein by this reference.

Information about the resources and relationships of an RDF graph may be stored in a table in a database system. A table that stores information about an RDF graph is referred to herein as an RDF table. Typically, within an RDF table, the graph information is stored in the form of "triples". A triple includes a subject (a subject resource), a predicate (a relationship between the subject resource and object resource), and an object (an object resource). The relationship values within triples are also referred to as "properties". RDF graphs do not have any redundant edges, so every triple stored in an RDF table must be unique.

Once an RDF table has been populated with information about an RDF graph, users may run queries against the RDF table to obtain information about the resources and/or relationships represented in the graph. A specialized query language, referred to as SPARQL, has been developed for retrieving and manipulating data stored in RDF format. SPARQL is described in detail at www.w3.org/TR/sparql11-query/ and https://www.w3.org/TR/sparql11-update/, the entire contents of both of which are incorporated herein by this reference. U.S. patent application Ser. No. 11/822,531, filed Dec. 7, 2021 and issued Nov. 21, 2023, entitled "METHOD AND SYSTEM FOR USING AUXILIARY TABLES FOR RDF DATA STORED IN A RELATIONAL DATABASE", the entire contents of which are incorporated herein, describes techniques for using auxiliary tables to improve performance of SPARQL queries that target individual RDF graphs.

It is common for a database to contain many RDF tables, each of which stores information for a distinct RDF graph. SPARQL supports the ability to retrieve/manipulate data from multiple RDF tables in a single query. When a SPARQL query operates on multiple RDF tables, the SPARQL query is said to target an "RDF graph set".

While there is no redundancy between triples in a single RDF graph, there may be redundancy between triples in an RDF graph set. That is, the triple (subject1, property1, object1) would not be duplicated within any individual RDF graphs (e.g. RDF tables X, Y or Z), but may be duplicated across multiple RDF tables (e.g. it may be in each of RDF Tables X, Y and Z). Thus, a SPARQL query that targets an RDF graph set that includes RDF tables X, Y and Z may cause retrieval of the same triple (subject1, property1, object1) from each of the RDF tables X, Y and Z.

Based on SPARQL semantics, SPARQL queries must produce results based on deduplicated datasets. Thus, all duplicate triples have to be removed from the data retrieved by SPARQL queries that target an RDF graph set. Unfortunately, the process of removing duplicate triples (generally referred to as "deduplication") is computationally expensive and consumes large amounts of memory. Consequently, the need to perform deduplication adds a significant amount of overhead to the execution of SPARQL queries that target RDF graph sets. Thus, techniques are needed for improving performance of SPARQL queries that target RDF graph sets.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings: (The acronym "PRT" used in this document stands for Precomputed Result Table)

FIG. 4 is a block diagram that depicts RDF tables that belong to a "Family" RDF graph set;

FIG. 6 is a block diagram of a star PRT that may be used to improve performance of SPARQL queries that target a RDF graph set, according to one implementation;

FIG. 7 is a block diagram of a chain PRT that may be used to improve performance of SPARQL queries that target a RDF graph set, according to one implementation;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

SPARQL Query Overview

SPARQL queries often specify "triple patterns" that indicate an "anchor" and resources that have specified relationships to the anchor. An example of a single triple pattern is:

Q1: {?mom:motherOf?kid}

This single triple pattern selects all triples in which the property is "motherOf". In the Q1 triple pattern, "mom" is the anchor variable, "motherOf" specifies the property, and "kid" is the variable to which "mom" has the "motherOf" property.

The property "motherOf" is a "forward" property in that the property goes in the same direction as the corresponding edge in the RDF directed graph. Triple patterns may use the prefix "^" to specify "reverse" relationships that go in the opposite direction as the corresponding edge in the RDF directed graph. For example, "^:motherOf", the reverse of the motherOf property, is semantically equivalent to ":hasMother". By using the reverse property prefix with the property "motherOf", the anchor of Q1 can be changed from "mom" to "kid" as follows:

Q2: {?kid^:motherOf?mom}

Q1 and Q2 select exactly the same triples (all triples with "motherOf" relationships), but Q2 specifies a reverse property, and therefore changes which variable serves as the anchor to the triple pattern.

A slightly more complex triple pattern may specify multiple relationships for the same anchor. For example, consider the triple pattern:

Q3: {?s:firstName?fnm.?s:lastName?lnm}

In Q3, the anchor is "s". Q3 specifies two properties "firstName" and "lastName" for the anchor "s", where "fnm" is the variable for the object of the "firstName" property, and "lnm" is the variable for the object of the "lastName" property. Thus, for any resource s, the triple pattern Q3 would return the firstname and lastname in the variables fnm, lnm, respectively.

Patterns that specify multiple properties for the anchor are referred to as "star patterns". In diagrams that represent star patterns, the anchor is in the middle with forward properties shown as edges pointing away from the anchor, and reverse properties shown as edges that are pointing towards the anchor.

SPARQL patterns may specify both forward and reverse properties for the anchor. Consider the following star pattern:

Q4: {?s:firstName?fnm.?s:lastName?lnm.?s^:fatherOf?dad.?s^:motherOf?mom}

Figure 1:
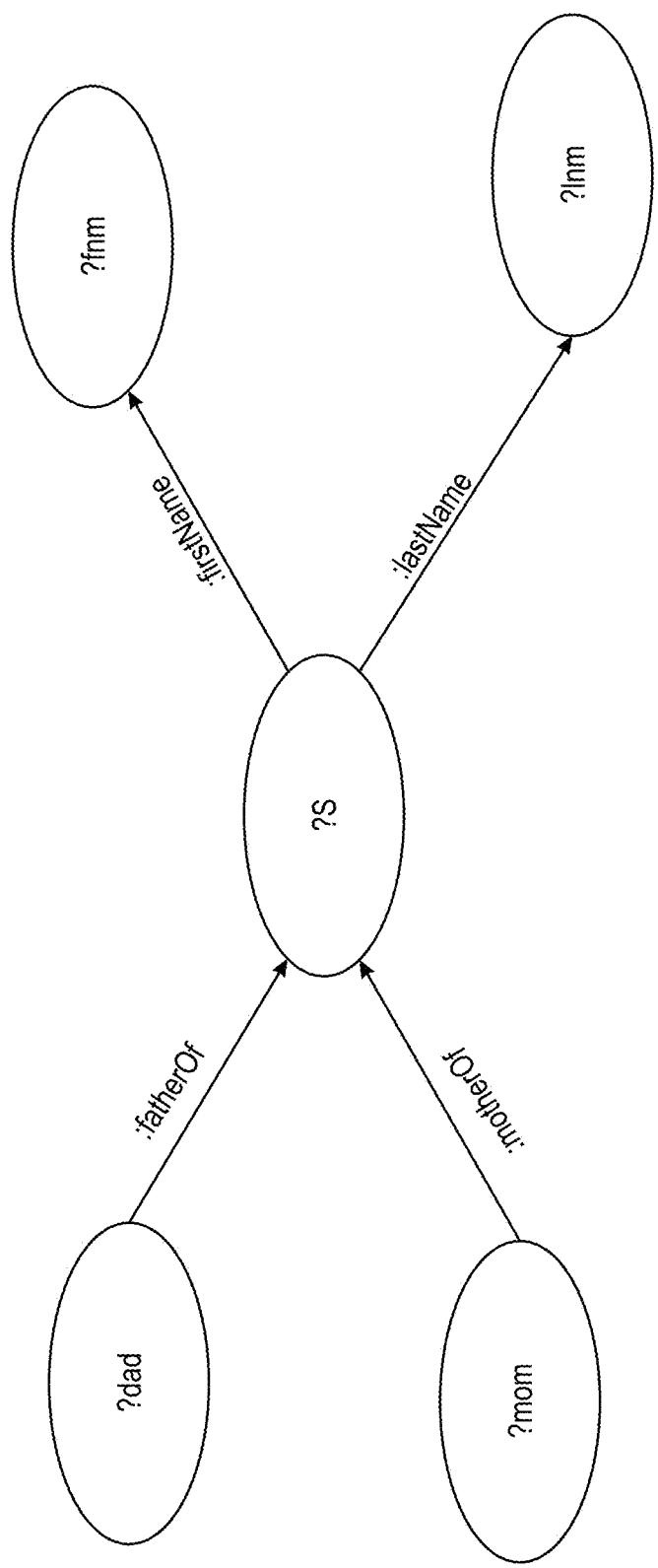
FIG. 1 is a diagram that depicts an example of a star pattern.

Similar to Q3, the anchor for Q4 is "s" and the triple pattern specifies the forward properties "firstName" and "lastName". However, Q4 additionally specifies the reverse properties ^:fatherOf and ^:motherOf. Thus, for any resource s, the star pattern of Q4 would return the firstname, lastname, father, and mother in the variables fnm, lnm, dad, and mom, respectively. FIG. 1 is a diagram that depicts the star pattern of Q4.

In addition to star patterns, SPARQL queries may also specify chain patterns. Chain patterns specify a sequence of two or more triple-patterns that form a chain. Thus, chain patterns select nodes that are two or more edges from the anchor. For example, consider the following example:

Q5: {?gma:motherOf?mom.?mom:motherOf?kid}

Figure 2:
FIG. 2 is a diagram that depicts an example of a chain pattern.

In this example, the pattern calls for the retrieval of:
the children of gma that are mothers, and
the children of the children of gma that are mothers That is, in any chain that matches the pattern of Q5, "gma" is the mother of the mother of "kid". FIG. 2 is a diagram that graphically depicts the chain pattern of Q5. As is illustrated by this example, the multiple edges that form the chain of a chain pattern may correspond to the same property (i.e. "motherOf").

Chain patterns may also include reverse properties, as in the following example:

Q6: {?gma:motherOf?mom.?mom: motherOf?kid.?kid^:fatherOf?dad.?dad^:fatherOf?gpa}

Figure 3:
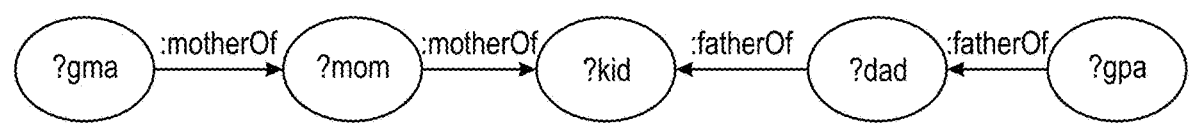
FIG. 3 is a diagram that depicts an example of a chain pattern that includes reverse properties.

FIG. 3 is a diagram that depicts the chain pattern of Q6. In Q6, the anchor is "kid", and the pattern selects "mom" which is one "motherOf" property away from "kid", and "gma" which is two "motherOf" properties away from kid. In addition, the pattern selects "dad" which is one reverse "fatherOf" property away from "kid", and "gpa" which is two reverse "fatherOf" properties from "kid".

GENERAL OVERVIEW

Techniques are provided for generating and maintaining Precomputed Result Tables ("PRTs") that are used by a database server to improve performance of SPARQL queries that target an RDF graph set. The PRTs that are used to improve performance of SPARQL queries that target an RDF graph set are stored in the database separate from the RDF tables that belong to the RDF graph set, but are populated based on the contents of the RDF tables that belong to the RDF graph set.

In one implementation, each PRT corresponds to a particular pattern. "Simple-triple PRTs" are PRTs that correspond to simple triple patterns, and are used for improving performance of SPARQL queries that include the simple triple patterns to which the simple-triple PRTs correspond. "Star PRTs" are PRTs that correspond to star patterns, and are used for improving performance of SPARQL queries that include the star patterns to which the star PRTs correspond. "Chain PRTs" are PRTs that correspond to chain patterns, and are used for improving performance of SPARQL queries that include the chain patterns to which the chain PRTs correspond.

It is necessary to "maintain" the PRTs to ensure that using the PRTs to speed up SPARQL queries will still produce accurate results. Such maintenance involves ensuring that the PRTs reflect all changes made by Data Manipulation Language (DML) statements to RDF tables. Thus, techniques for maintaining results tables, both incrementally and for bulk updates, are also described hereafter.

Example RDF Tables

For the purpose of explanation, it shall be assumed that a database 400 stores the RDF tables that are illustrated in FIG. 4. Referring to FIG. 4, six RDF tables (tables 410, 412, 414, 416, 418, 420) are stored in database 400. Within each table, the triples are unique. However, when taken collectively as an RDF graph set, there are duplicate triples.

For the purpose of explanation, it shall be assumed that "Family" is the name of the RDF graph set created by the union of tables 410, 412, 414, 416, 418, and 420. Within the Family RDF graph set, the following triples appear two or more times:

:beth:motherOf:sue (in tables 410 and 412)
:sue:motherOf:rick (in tables 410 and 414)
:dan:fatherOf:rick (in tables 410 and 418)
:bob:fatherOf:dan (in tables 410 and 420)
:rick:lname "Smith" (in tables 414 and 416)
:rick:plays:soccer (in tables 414 and 416)

Figure 5:
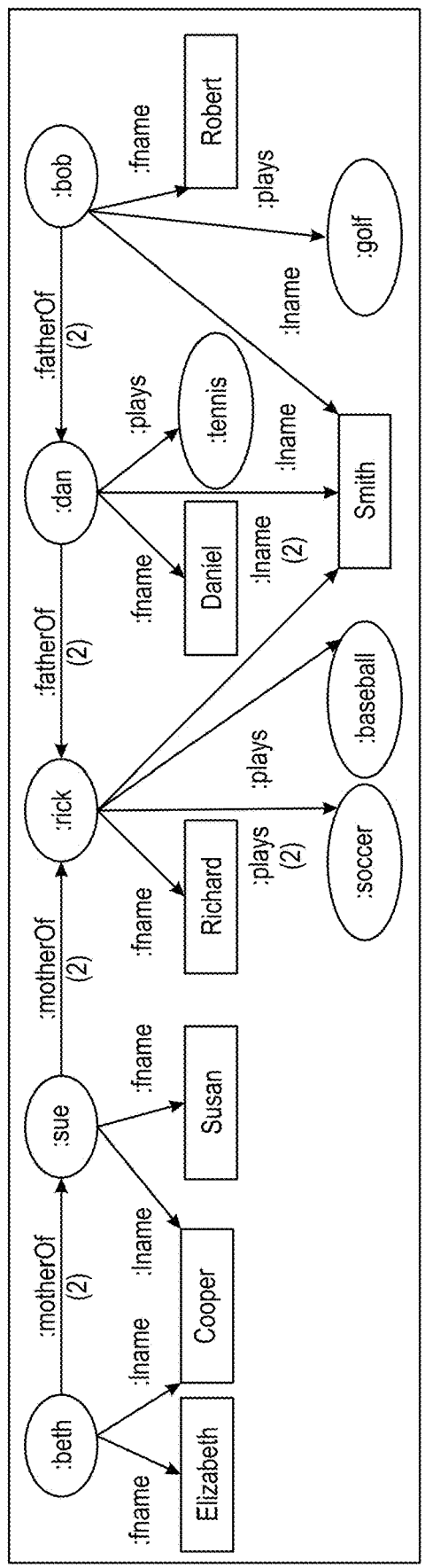
FIG. 5 is a diagram that graphically illustrates the content of the Family RDF graph set.

FIG. 5 illustrates the contents of the Family RDF graph set in the form of a directed graph, where a "(2)" next to an edge indicates that the triple represented by the edge is duplicated within the Family RDF graph set. For edges that are unique in the Family RDF graph set, no number is shown next to the edge (in such cases, a "1" is implicit).

In the present example, no edge has more than 2 duplicates within the Family RDF graph set. However, it is possible for the same triple to be duplicated in every RDF graph/table of an RDF graph set. Thus, in an RDF graph set with n RDF graphs/tables, the same triple may be duplicated up to n times.

Creating PRTs

As mentioned above, for any given RDF graph set, PRTs may be created to speed up the processing of SPARQL queries that target the RDF graph set. According to one implementation, each PRT has a pattern (its "PRT pattern"), and a target RDF graph set. Each PRT is populated with the deduplicated results produced by executing a SPARQL query that specifies its PRT pattern against its RDF graph set. Examples shall now be given of PRTs for each of the three types of patterns: simple triple patterns, star patterns, and chain patterns.

PRTs for Simple Triple Patterns

For the purpose of explanation, it shall be assumed that a PRT named "RT_triple" has the following attributes:
PRT pattern={?x:plays:?game}
RDF graph set=Family In this example, RT_triple is associated with a simple triple pattern. Under these circumstances, the prior to deduplication, the results produced by executing the PRT pattern against the Family RDF graph set (graphically illustrated in FIG. 5) would be:

| start_node (?x) | P<:plays> (?game) |
|---|---|
| :rick | :soccer |
| :rick | :soccer |
| :rick | :baseball |
| :dan | :tennis |
| :bob | :golf |

According to one implementation, as deduplication is performed, the database server counts how many instances of each edge/triple exist in the RDF graph set and records that information in a separate column of the PRT. Thus, after deduplication, RT_triple would be populated as follows:

| start_node (?x) | P<:plays> (?game) | C<:plays> |
|---|---|---|
| :rick | :soccer | 2 |
| :rick | :baseball | 1 |
| :dan | :tennis | 1 |
| :bob | :golf | 1 |

The "C<:plays>" column of each row stores the count of instances of the triple that is represented by the row. Since the triple ":rick:plays:soccer" appears twice in the Family RDF graph set, in the row for that triple, the "C<:plays>" column stores the value "2". As shall be described in greater detail hereafter, such duplicate tracking columns are used to maintain PRTs during DML operations that affect the contents of the RDF tables that belong to the RDF graph set.

PRTs for Star Patterns

For the purpose of explanation, assume that a PRT named "RT_star" has the following attributes:
PRT pattern={?x:firstName?fnm.?x:lastName?lnm.?x^:fatherOf?dad.?x^:motherOf?mom}
RDF graph set=Family In this example, RT_star is associated with the same star pattern that is graphically illustrated in FIG. 1. In SPARQL, the results produced by star patterns are permitted to have missing properties. Consequently, after deduplication, the results produced by executing the PRT pattern {?x:firstName?fnm.?x:lastName?lnm.?x^:fatherOf?dad.?x^:motherOf?mom} against the Family RDF graph set would be table 600 illustrated in FIG. 6. As illustrated in table 600, the row for :beth is missing both a ^:fatherOf edge and a ^:motherOf edge. The row for :rick, on the other hand, has all edges specified in the star pattern.

In table 600, the column "C<:fname>" indicates, for each row, how many instances of the "fname" edge represented in the row are present in the Family RDF graph set. The column "C<:lname>" indicates, for each row, how many instances of the "lname" edge represented in the row are present in the Family RDF graph set. The column "C<:fatherOf>" indicates, for each row, how many instances of the "^:fatherOf" edge represented in the row are present in the Family RDF graph set. The column "C<:motherOf>" indicates, for each row, how many instances of the "^:motherOf" edge represented in the row are present in the Family RDF graph set.

PRTs for Chain Patterns

For the purpose of explanation, assume that a PRT named "RT_chain" has the following attributes:
PRT pattern={?gma:motherOf?mom.?mom:motherOf?kid.?kid^:fatherOf?dad.?dad^:fatherOf?gpa}
RDF graph set=Family In this example, RT_chain is associated with the chain pattern that is illustrated in FIG. 3. In SPARQL, the results produced by chain patterns are not permitted to have any empty links. Consequently, after deduplication, the results produced by executing the PRT pattern against the RDF graph set would be the single row contained in table 700 illustrated in FIG. 7.

In table 700, the column "C<:motherOf>" indicates, for each row, how many instances of the ":motherOf" edge represented in the row are present in the Family RDF graph set. Column "C<:motherOf>#2" indicates, for each row, how many instances of the ":motherOf #2" edge (the second instance of the :motherOf property) represented in the row are present in the Family RDF graph set. Column "C<:fatherOf>" indicates, for each row, how many instances of the "^:fatherOf" edge represented in the row are present in the Family RDF graph set. Column "C<:fatherOf>#2" indicates, for each row, how many instances of the "^:fatherOf #2" edge represented in the row are present in the Family RDF graph set.

Improving Query Performance Through the Use of PRTs

Once a PRT has been created for a particular pattern/RDF-graph-set combination, the PRT may be used to improve performance of SPARQL queries that:
    target the RDF graph set associated with the PRT, and
    for any type of PRT, specify a pattern that is the same as or a superset of the PRT pattern of the PRT
    for star PRTs, specify a pattern that is a subset of the PRT pattern of the PRT The work of joining and deduplicating edges from the RDF tables of an RDF graph set is performed during the creation of a PRT. Consequently, when PRTs are used to answer SPARQL queries, the joins and deduplication that would otherwise be required to obtain the results of the PRT pattern need not be repeated during execution of SPARQL queries that contain the PRT pattern.

Figure 8:
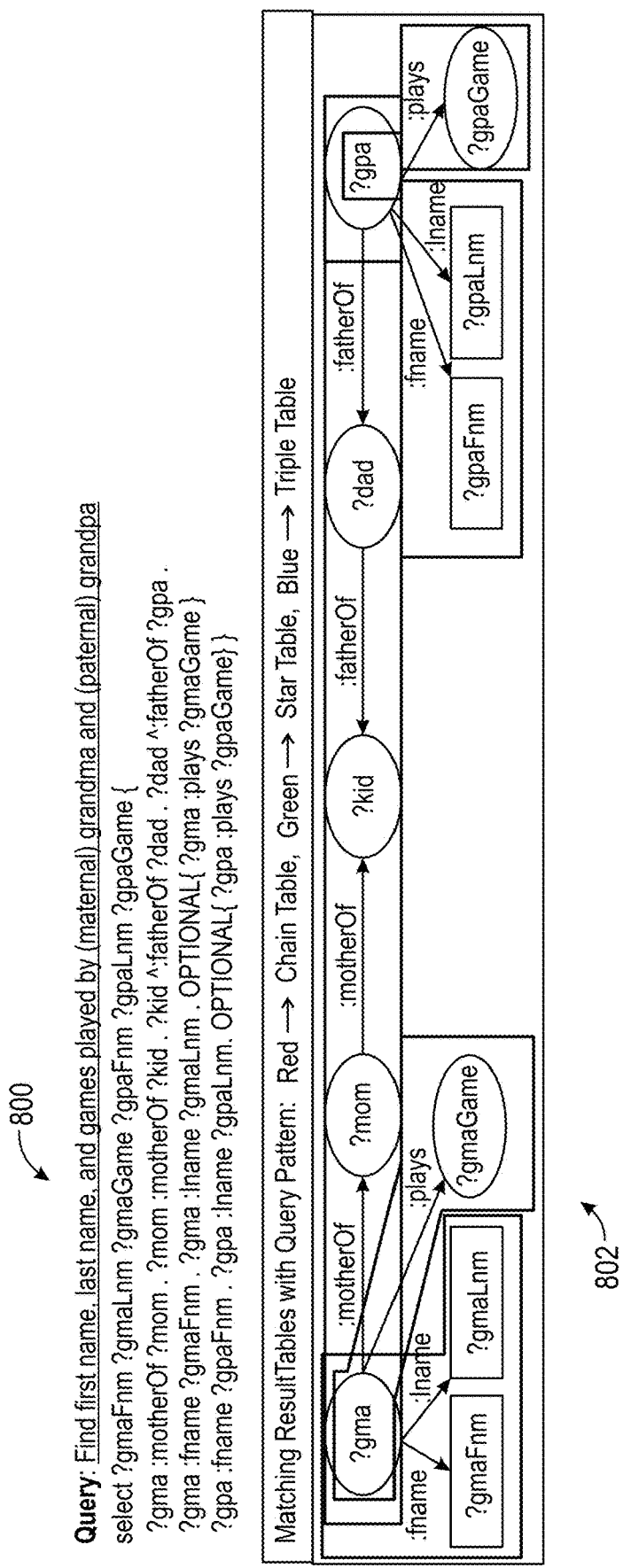
FIG. 8 is a block diagram that illustrates how a query may be broken up into sub-patterns that match several of the PRTs, according to one implementation.

Complex SPARQL queries may include many patterns. Consequently, it is possible for a single SPARQL query to be a superset of several PRT patterns. An example of such a query is illustrated in FIG. 8. Referring to FIG. 8, it illustrates a query 800 that requests, for each individual represented in the Family RDF graph set, the first name, last name, and games played by (maternal) grandma and (paternal) grandpa. Diagram 802 illustrates how query 800 may be broken up into sub-patterns that match several of the PRTs that have been created for the Family RDF graph set.

In the example illustrated in FIG. 8, query 800 is broken up into the following sub-patterns:
?gma:plays?gmaGame
?gpa:plays?gpaGame
?gma:motherOf?mom.?mom:motherOf?kid.?kid^:fatherOf?dad.?dad^:fatherOf?gpa
?gma:fname?gmaFnm.?gma:lname?gmaLnm
?gpa:fname?gpaFnm.?gpa:lname?gpaLnm Rather than performing the joins and deduplication required to execute the sub-pattern "?gma:plays?gmaGame" against the Family RDF graph set, pre-computed results for the sub-pattern "?gma:plays?gmaGame" may be obtained from the PRT table named RT_triple, described above. Rather than performing the joins and deduplication required to execute the sub-pattern "?gpa:plays?gpaGame" against the Family RDF graph set, pre-computed results for the sub-pattern "?gpa:plays?gpaGame" may also be obtained from RT_triple.

The sub-pattern "?gma:motherOf?mom.?mom:motherOf?kid.?kid^:fatherOf?dad.?dad^:fatherOf?gpa" matches the PRT pattern for the RT_chain PRT described above. Consequently, rather than performing the joins and deduplication required to execute the sub-pattern X against the Family RDF graph set, the precomputed results for this sub-pattern may be obtained from RT_chain.

The sub-pattern "?gma:fname?gmaFnm.?gma:lname?gmaLnm" is a subset of the PRT pattern for the RT_star PRT described above. Consequently, rather performing the joins and deduplication required to execute the sub-pattern "?gma:fname?gmaFnm.?gma:lname?gmaLnm" against the Family RDF graph set, pre-computed results for this sub-pattern of query 800 may be obtained from RT_star. Likewise, the sub-pattern "?gpa:fname?gpaFnm.?gpa:lname?gpaLnm" is a subset of the PRT pattern for the RT_star PRT described above. Consequently, rather than performing the joins and deduplication required to execute the sub-pattern "?gpa:fname?gpaFnm.?gpa:lname?gpaLnm" against the Family RDF graph set, pre-computed results for this sub-pattern of query 800 may be obtained from RT_star.

Because the results for each sub-pattern of query 800 can be obtained from PRTs of the Family RDF graph set rather than the RDF tables of the Family RDF graph set, the database server is able to answer query 800 by performing joins between the PRTs. The overhead required to join the PRTs to answer query 800 (four joins) is significantly less than would be required to perform the joins between the underlying RDF tables (nine joins). Further, those PRTs may be used even in cases where the patterns involve multiple instances of the same property (e.g. :motherOf), and both forward and reverse properties (e.g. ":motherOf" and "^:fatherOf").

Maintaining PRTs

PRTs can only be used to speed up SPARQL queries that access RDF graph sets if using the PRTs will give accurate results. For PRTs to give accurate results, the PRTs have to be maintained in such a manner that they reflect the current contents of the RDF tables that belong to the RDF graphs in the corresponding RDF graph set. For example, DML operations that change the contents of any of the RDF tables that belong to the Family RDF graph set (illustrated in FIG. 4) may necessitate changes to one or more of the PRTs built for the Family RDF graph set (i.e. RT_triple, RT_star, and RT_chain).

In one implementation, if a PRT includes the property:p (or the reverse property ^:p) of a triple {:s:p:o} that is being deleted or inserted, then the PRT is maintained as follows:
Star PRTs:
  Delete: Decrement the COUNT cell that corresponds to the triple (if currently 1, then set to NULL)
  Insert: If no rows exist for this triple, add a row for it. Increment the COUNT (if currently NULL, then set to 1)
Chain PRTs:
  Delete: Decrement the COUNT cell(s) corresponding to the triple (if currently 1, then delete the row)
  Insert: Add a row for every new chain that gets created with the new triple. Increment the COUNTs (if currently NULL, then set to 1)
Simple-triple PRTs:
  Delete: Decrement the COUNT cell that corresponds to the triple (if currently 1, then delete the row)
  Insert: If no rows exist for this triple, add a row for it. Increment the COUNT (if currently NULL, then set to 1)

Examples of PRT maintenance shall now be given with reference to the Family RDF graph set whose initial contents is illustrated graphically in FIG. 5.

Insertion of Duplicate Triples

As explained above, no RDF table is allowed to have duplicate triples. However, it is permissible to insert into one RDF table a triple that is identical to a triple that resides in another RDF table that belongs to the same RDF graph set. For the purpose of explanation, it shall be assumed that the triple ":bob:fatherOf:dan" is inserted into the Dan table 418 (illustrated in FIG. 4). The insertion of this triple into Dan table 418 is not prohibited, since an instance of the triple does not currently exist in Dan table 418. However, two instances of this triple already exist in the Family RDF graph set: one in Relations table 410, and one in Bob table 420.

In response to the insertion of a duplicate triple, the database server finds all PRT rows that include the triple for which a duplicate has been inserted. For the purpose of finding matching triples in PRTs, triples that are semantically equivalent are treated as being identical. Thus, in the present case, the triple ":dan^:fatherOf:bob" is treated as being identical to ":bob:fatherOf:dan".

Figure 9:
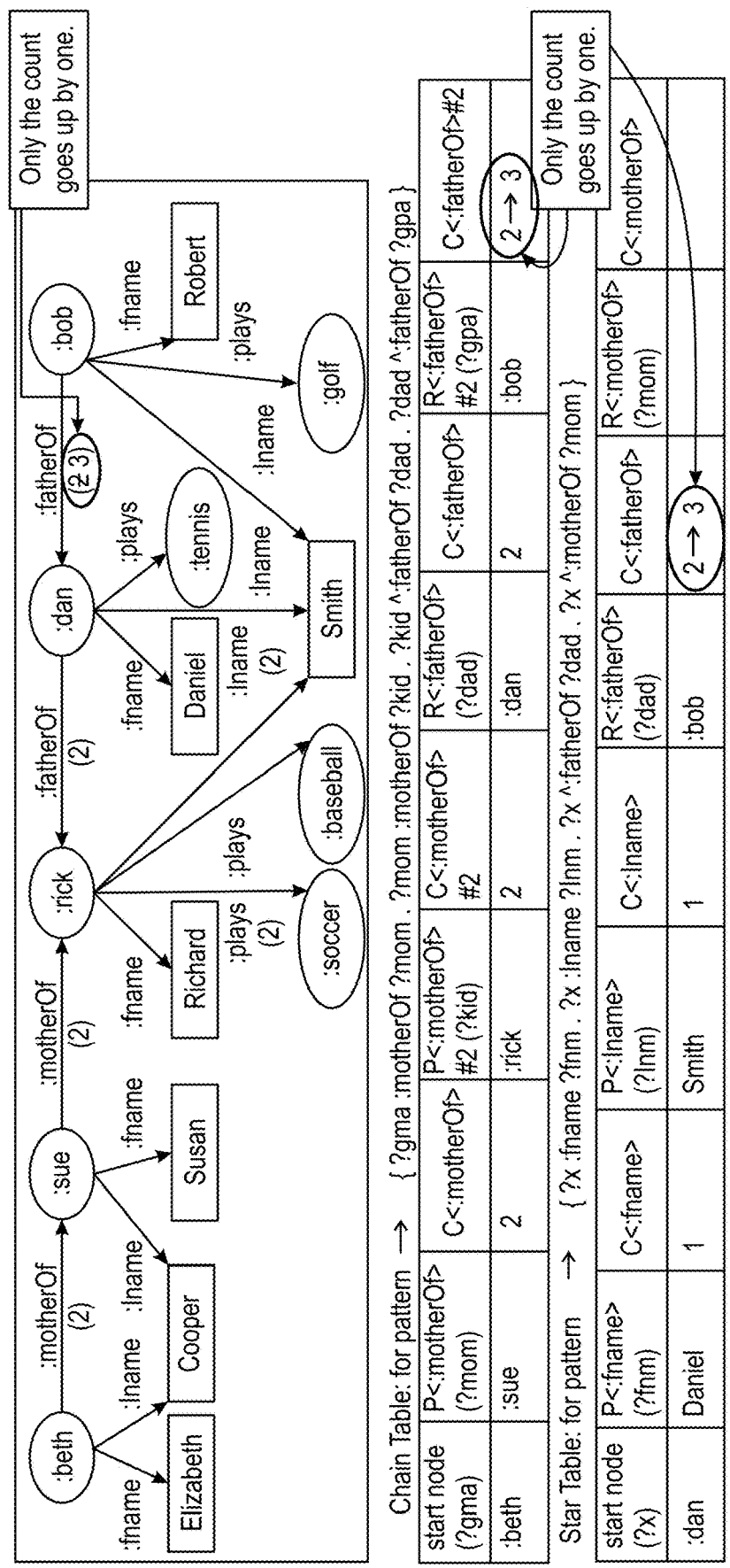
FIG. 9 is a block diagram that illustrates how PRTs may be maintained in response to an insertion of a duplicate triple, according to one implementation.

Once such PRT rows that contain triples that semantically match the newly-inserted triple are identified, the database server increments the count associated with the matching triple in those rows. In the present example, both RT_chain and RT_star have rows that include semantic equivalents to the triple ":bob fatherOf:dan". Consequently, in response to the insertion of an instance of ":bob fatherOf:dan" into Dan table 418, the database server updates the relevant rows of RT_chain and RT_star to increment the count associated with the matching triples, as illustrated in FIG. 9.

Insertion of New Triples

Insertions of new triples (triples that do not already exist in any RDF table in the RDF graph set) are handled differently than the insertion of duplicate triples (triples for which at least one instance already exists in the RDF graph set). For the purpose of illustrating how PRTs are maintained in response to the insertion of a new triple, it shall be assumed that the triple ":sue:motherOf:sam" is inserted into Sue table 414. In this example:

the triple ":sue:motherOf:sam" did not previously exist in any of the RDF tables of the Family RDF graph set, and
the new triple involves a new anchor (":sam") that did not previously exist in the Family RDF graph set The database server responds to an insertion of a new triple that introduces a new anchor by inserting a row for the new anchor in all simple-triple and star PRTs that include:

the same property as the new triple (e.g. "^:motherOf"), or
the reverse of the property in the new triple (e.g. "^:motherOf")

Figure 10:
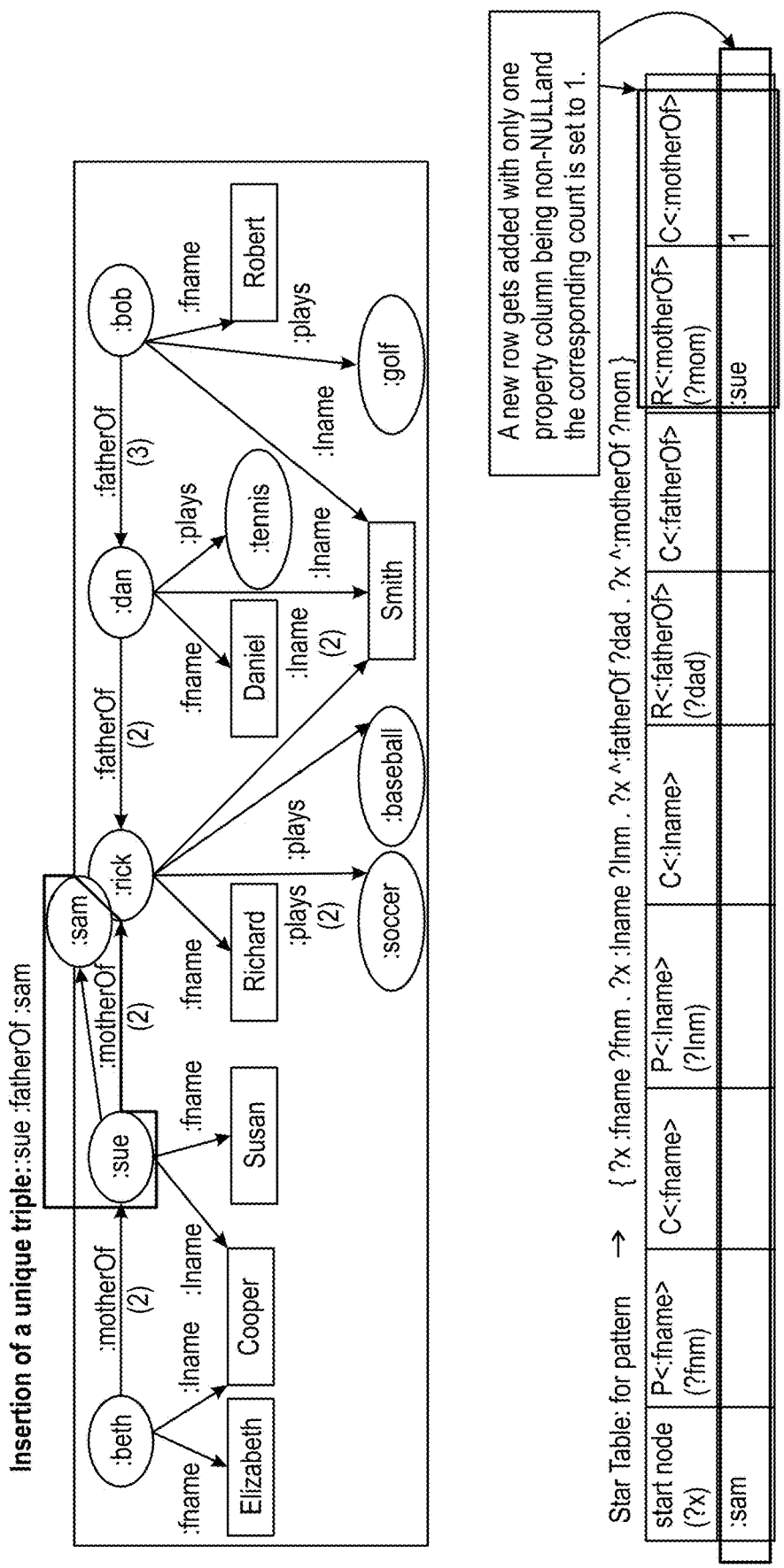
FIG. 10 is a is a block diagram that illustrates how PRTs may be maintained in response to an insertion of a unique triple, according to one implementation.

In the present example, RT_star includes the property "^:motherOf". Consequently, in response to ":sue:motherOf:sam" being inserted into Sue table 414, a new row is added to RT_star. In the new row, all property columns for the new anchor are NULL except for the property specified in the new triple. FIG. 10 is a block diagram that illustrates the row that would be inserted into RT_star in response to the insertion of ":sue:motherOf:sam" in Sue table 414.

The insertion of a new triple may also require the database server to update chain PRTs. Specifically, in response to the insertion of a triple that creates a new chain that matches the chain pattern of a chain PRT, the database server adds a new row to that chain PRT.

For the purpose of illustration, it shall be assumed that, after adding the ":sue:motherOf:sam" triple, the triple ":dan fatherOf:sam" is added to Dan table 418. The addition of the triple ":dan fatherOf:sam" does not involve a new anchor (both "dan" and "sam" are already in the Family RDF graph set.

The addition of the ":dan fatherOf:sam" triple creates a new chain that matches the chain pattern {?gma:motherOf-?mom.?mom: motherOf?kid.?kid^:fatherOf?dad.?dad^:fatherOf?gpa} of RT_chain. Therefore, the insertion of the ":dan fatherOf:sam" triple causes the database server to add a row to RT_chain for the new chain.

Figure 11:
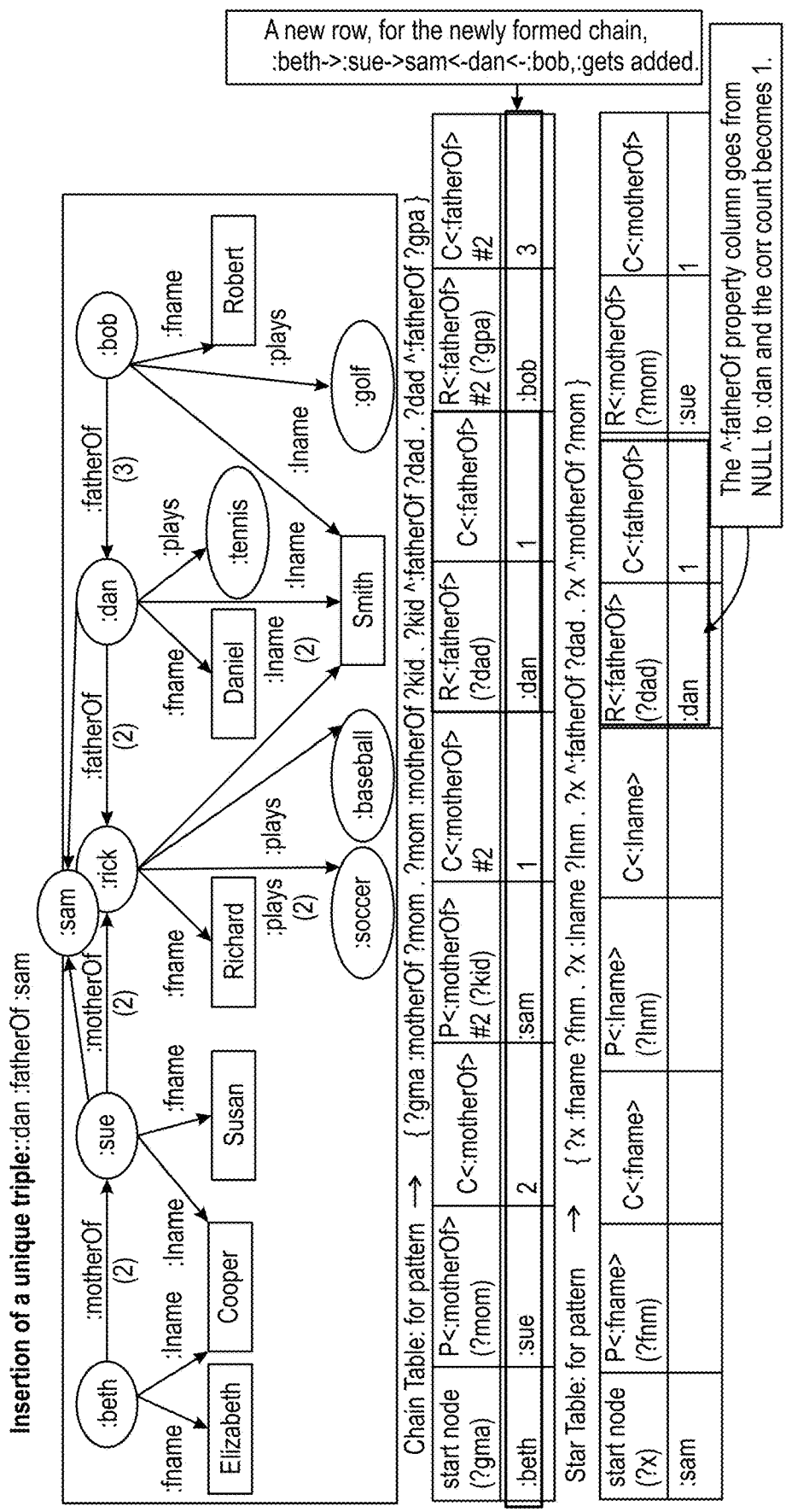
FIG. 11 is a is a block diagram that illustrates how PRTs may be maintained in response to an insertion of a unique triple that creates a new chain, according to one implementation.

In addition to any updates to chain tables, adding a new triple may require existing rows in star PRTs to be updated. In the present example, the insertion of the ":dan fatherOf:sam" triple creates a triple, associated with the "^:fatherOf" property, that was previously missing from the RT_star row for the anchor ":sam". Therefore, the insertion of the ":dan fatherOf:sam" triple causes the RT_star row associated with the anchor "sam" to be updated to reflect the new object of the "^:fatherOf" property for ":sam". The updates caused to RT_chain and RT_star in response to the insertion of the ":dan fatherOf:sam" triple are illustrated in FIG. 11.

Deletion of Duplicate Triples

Figure 12:
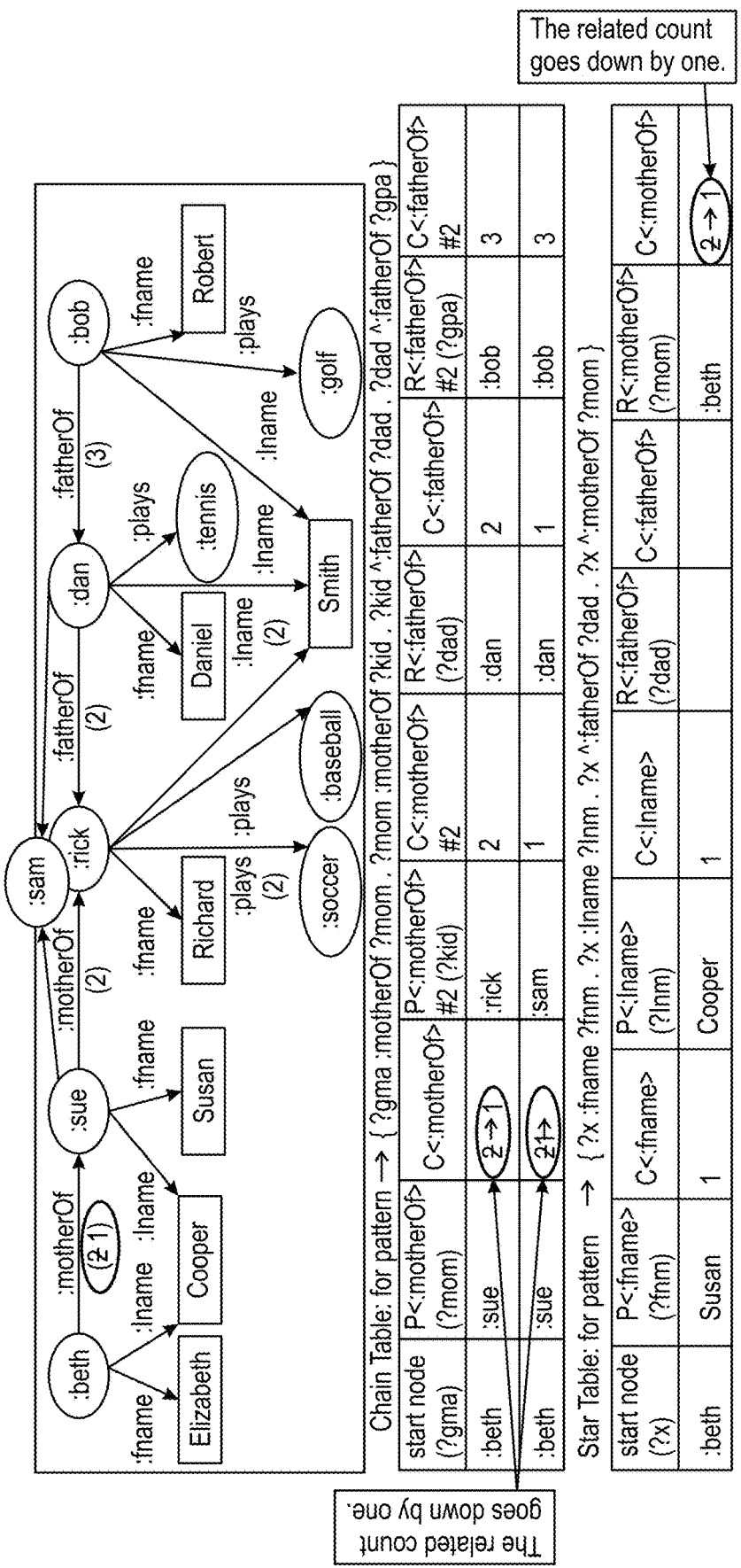
FIG. 12 is a block diagram that illustrates how PRTs may be maintained in response to a deletion of a duplicate triple, according to one implementation.

In response to the deletion of a duplicate triple from an RDF graph set, the PRTs for the graph set that have rows that reflect the triple must be updated to decrement the count value of the triple. For example, assume that one instance of the ":beth:motherOf:sue" triple is deleted from the Family RDF graph set. The ":beth:motherOf:sue" triple is reflected in two rows of RT_chain and one row of RT_star. Consequently, the deletion of one instance of the ":beth:motherOf:sue" triple from the Family RDF graph set would result in the count values of three PRT rows being updated, as illustrated in FIG. 12.

Deletion of Unique Triples

Unlike the deletion of duplicate triples, the deletion of unique triples may break a link in a chain that is reflected in a chain PRT. For example, assume that, after deleting one instance of the ":beth:motherOf:sue" triple, the last remaining instance of the ":beth:motherOf:sue" triple is also deleted. The ":beth:motherOf:sue" triple was part of two chains reflected in RT_chain (see FIG. 12). Since a chain PRT cannot have chains with missing links, the two RT_chain rows that were based on ":beth:motherOf:sue" triple must be deleted after the deletion of the last instance of the ":beth:motherOf:sue" triple.

Figure 13:
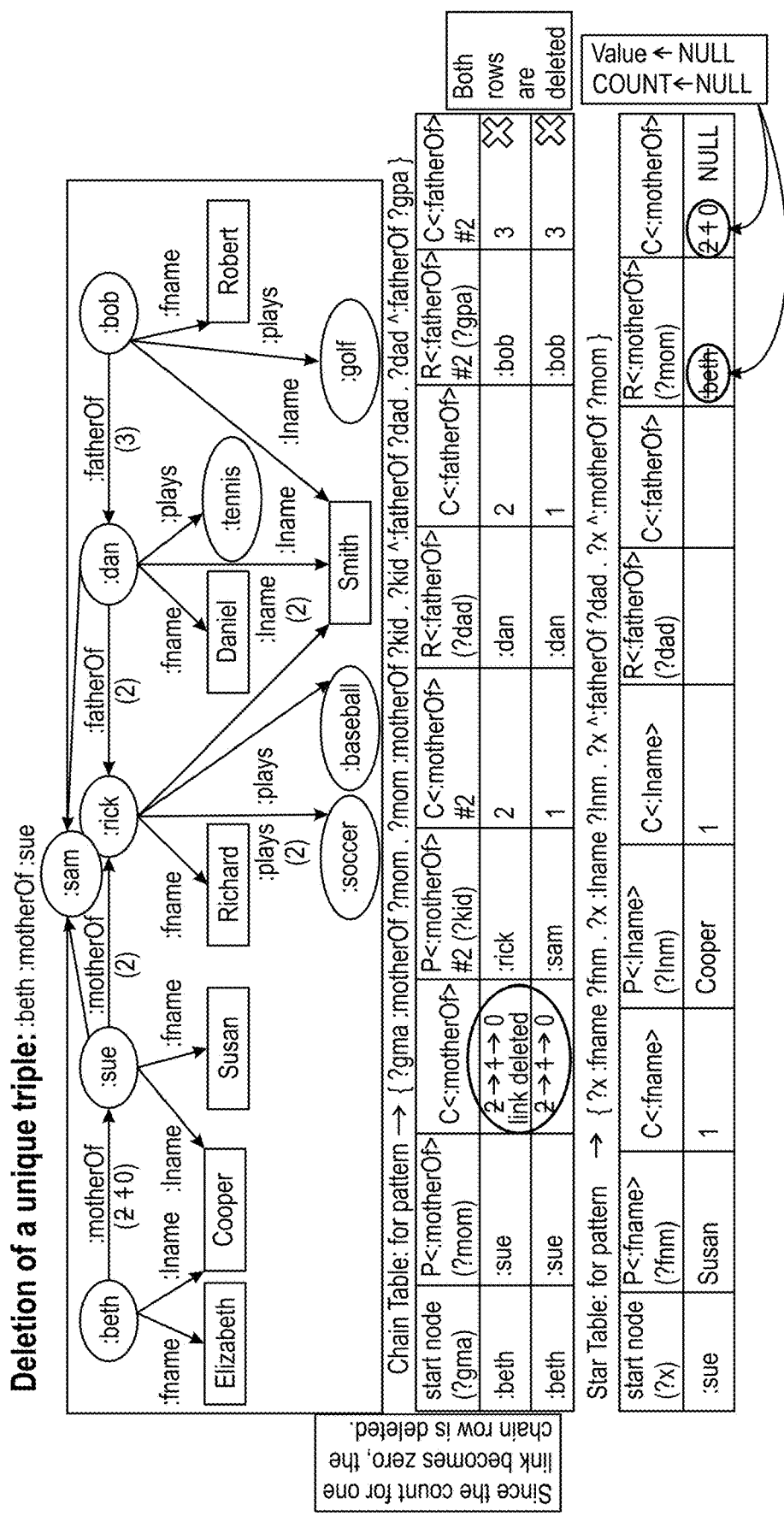
FIG. 13 is a block diagram that illustrates how PRTs may be maintained in response to a deletion of a unique triple, according to one implementation.

In addition, when the last instance of a triple is deleted, any rows in star PRTs that reflect the triple must also be updated so that the columns of the star PRT table rows that reflect the triple no longer reflect the triple. Since star PRT rows are allowed to contain empty properties, the rows that reflect the deleted triple are not deleted. Instead, the values of the relevant columns are set to NULL, and the count value associated with the triple is set to zero or NULL. FIG. 13 illustrates the changes that are performed by the database server in response to deletion of the last instance of the ":beth:motherOf:sue" triple. If setting the relevant columns to NULL would cause any star PRT table row to contain only NULLs, then (optionally) the row may be deleted from the star PRT table.

Maintaining PRTs During Bulk Update Operations

Performing the necessary PRT maintenance in response to the insertion/deletion of each individual triple in a bulk load operation would add a significant amount of overhead to the bulk load operation. Therefore, in one implementation, the database server ignores the PRTs during bulk load operations, and rebuilds them once the bulk load operations have finished. Specifically, in one embodiment, at the start of a bulk load operation, any PRTs affected by the bulk load operation are made invisible to the SPARQL query translator. As a result, the metadata for the PRTs remain intact within the database, but the insertions/deletions of the bulk load do not cause any maintenance of the PRTs to be performed.

Because no maintenance of the PRTs is performed, the content of the PRTs ceases to reflect the content of the affected RDF graph set. Consequently, after completion of the bulk load operation, the PRTs are truncated and then repopulated. After the PRTs have been repopulated to reflect the current contents of the RDF graph set, the PRTs are once again made visible to the SPARQL query translator.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 14:
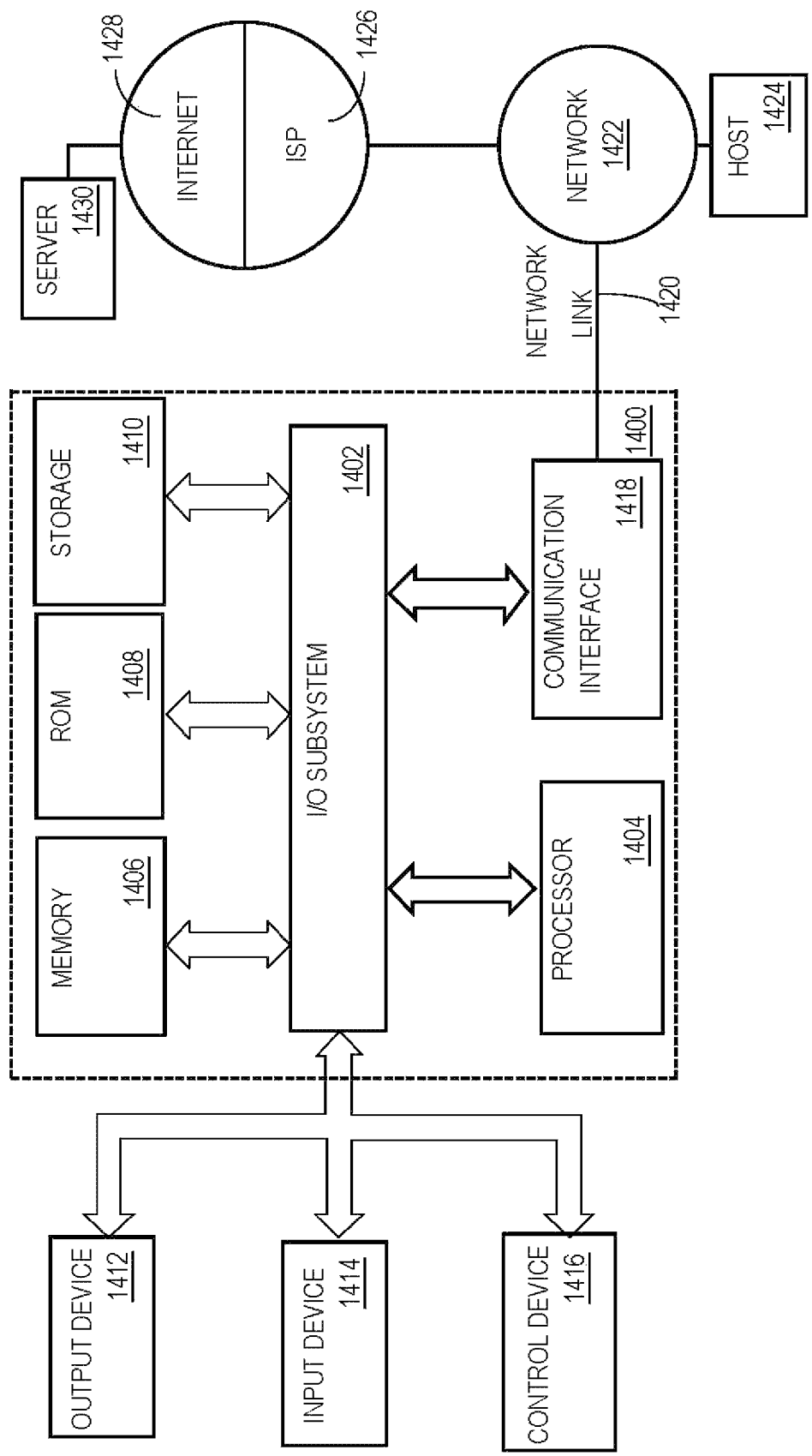
FIG. 14 is a block diagram that illustrates a computer system upon which the techniques described herein may be implemented.

For example, FIG. 14 is a block diagram that illustrates a computer system 1400 upon which an embodiment of the invention may be implemented. Computer system 1400 includes a bus 1402 or other communication mechanism for communicating information, and a hardware processor 1404 coupled with bus 1402 for processing information. Hardware processor 1404 may be, for example, a general purpose microprocessor.

Computer system 1400 also includes a main memory 1406, such as a random access memory (RAM) or other dynamic storage device, coupled to bus 1402 for storing information and instructions to be executed by processor 1404. Main memory 1406 also may be used for storing temporary variables or other intermediate information during execution of instructions to be executed by processor 1404. Such instructions, when stored in non-transitory storage media accessible to processor 1404, render computer system 1400 into a special-purpose machine that is customized to perform the operations specified in the instructions.

Computer system 1400 further includes a read only memory (ROM) 1408 or other static storage device coupled to bus 1402 for storing static information and instructions for processor 1404. A storage device 1410, such as a magnetic disk, optical disk, or solid-state drive is provided and coupled to bus 1402 for storing information and instructions.

Computer system 1400 may be coupled via bus 1402 to a display 1412, such as a cathode ray tube (CRT), for displaying information to a computer user. An input device 1414, including alphanumeric and other keys, is coupled to bus 1402 for communicating information and command selections to processor 1404. Another type of user input device is cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane.

Computer system 1400 may implement the techniques described herein using customized hard-wired logic, one or more ASICs or FPGAs, firmware and/or program logic which in combination with the computer system causes or programs computer system 1400 to be a special-purpose machine. According to one embodiment, the techniques herein are performed by computer system 1400 in response to processor 1404 executing one or more sequences of one or more instructions contained in main memory 1406. Such instructions may be read into main memory 1406 from another storage medium, such as storage device 1410. Execution of the sequences of instructions contained in main memory 1406 causes processor 1404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1410. Volatile media includes dynamic memory, such as main memory 1406. Common forms of storage media include, for example, a floppy disk, a flexible disk, hard disk, solid-state drive, magnetic tape, or any other magnetic data storage medium, a CD-ROM, any other optical data storage medium, any physical medium with triple patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1402. Transmission media can also take the form of acoustic or light waves, such as those generated during radio-wave and infra-red data communications.

Various forms of media may be involved in carrying one or more sequences of one or more instructions to processor 1404 for execution. For example, the instructions may initially be carried on a magnetic disk or solid-state drive of a remote computer. The remote computer can load the instructions into its dynamic memory and send the instructions over a telephone line using a modem. A modem local to computer system 1400 can receive the data on the telephone line and use an infra-red transmitter to convert the data to an infra-red signal. An infra-red detector can receive the data carried in the infra-red signal and appropriate circuitry can place the data on bus 1402. Bus 1402 carries the data to main memory 1406, from which processor 1404 retrieves and executes the instructions. The instructions received by main memory 1406 may optionally be stored on storage device 1410 either before or after execution by processor 1404.

Computer system 1400 also includes a communication interface 1418 coupled to bus 1402. Communication interface 1418 provides a two-way data communication coupling to a network link 1420 that is connected to a local network 1422. For example, communication interface 1418 may be an integrated services digital network (ISDN) card, cable modem, satellite modem, or a modem to provide a data communication connection to a corresponding type of telephone line. As another example, communication interface 1418 may be a local area network (LAN) card to provide a data communication connection to a compatible LAN. Wireless links may also be implemented. In any such implementation, communication interface 1418 sends and receives electrical, electromagnetic or optical signals that carry digital data streams representing various types of information.

Network link 1420 typically provides data communication through one or more networks to other data devices. For example, network link 1420 may provide a connection through local network 1422 to a host computer 1424 or to data equipment operated by an Internet Service Provider (ISP) 1426. ISP 1426 in turn provides data communication services through the world wide packet data communication network now commonly referred to as the "Internet" 1428. Local network 1422 and Internet 1428 both use electrical, electromagnetic or optical signals that carry digital data streams. The signals through the various networks and the signals on network link 1420 and through communication interface 1418, which carry the digital data to and from computer system 1400, are example forms of transmission media.

Computer system 1400 can send messages and receive data, including program code, through the network(s), network link 1420 and communication interface 1418. In the Internet example, a server 1430 might transmit a requested code for an application program through Internet 1428, ISP 1426, local network 1422 and communication interface 1418.

The received code may be executed by processor 1404 as it is received, and/or stored in storage device 1410, or other non-volatile storage for later execution.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    storing, in a database, a plurality of RDF tables;
    populating each table, of the plurality of RDF tables, with information that represents an RDF graph;
    for a particular RDF graph set, generating and storing, in the database, one or more pre-computed result tables (PRTs);
    wherein the particular RDF graph set includes the RDF graphs represented by the information in the plurality of RDF tables;
    wherein each PRT of the one or more PRTs is associated with a distinct pattern;
    populating each PRT of the one or more PRTs based on which information in the particular RDF graph set matches the distinct pattern associated with the PRT;
    wherein populating each PRT involves:
        performing joins between two or more RDF tables of the plurality of RDF tables, and
        deduplicating duplicate rows in the result of the joins due to triples that are repeated in the two or more RDF tables;
    performing updates to the one or more PRTs to cause the one or more PRTs to reflect changes made by DML operations to information in the plurality of RDF tables;
    receiving a SPARQL query that targets the particular RDF graph set;
    identifying a particular PRT, of the one or more PRTs, that is associated with a pattern that matches a sub-pattern of the SPARQL query;
    obtaining results for the sub-pattern of the SPARQL query from the particular PRT; and
    generating results for the SPARQL query based, at least in part, on the results for the sub-pattern of the SPARQL query obtained from the particular PRT;
    wherein the method is performed by one or more computing devices.

2. The method of claim 1 wherein the particular PRT is a chain PRT associated with a chain pattern.

3. The method of claim 2 wherein the chain pattern includes one or more reverse properties.

4. The method of claim 2 wherein the chain pattern includes multiple instances of a particular property.

5. The method of claim 1 wherein the particular PRT is a star PRT associated with a star pattern.

6. The method of claim 5 wherein the star pattern includes one or more reverse properties.

7. The method of claim 1 wherein:
    the one or more PRTs include a plurality of PRTs;
    the method further comprises identifying one or more additional PRTs, of the plurality of PRTs, that are associated with patterns that match sub-patterns of the SPARQL query; and
    generating results for the SPARQL query includes generating results for the SPARQL query based on information obtained from the one or more additional PRTs.

8. The method of claim 1 wherein performing updates to the one or more PRTs includes, in response to insertion of a particular triple for which an instance already exists in the particular RDF graph set, incrementing a count for the particular triple in each row of each of the one or more PRTs that includes a semantic equivalent of the particular triple.

9. The method of claim 1 wherein performing updates to the one or more PRTs includes, in response to insertion of a particular triple for which no instance already exists in the particular RDF graph set:

determining that insertion of the particular triple creates a new chain that matches a chain pattern of a chain PRT that belongs to the one or more PRTs; and inserting a row in the chain PRT for the new chain.

10. The method of claim 1 wherein performing updates to the one or more PRTs includes, in response to insertion of a particular triple for which no instance already exists in the particular RDF graph set:

determining that insertion of the particular triple adds a new anchor in the particular RDF graph set; and inserting a row associated with the new anchor in a star PRT that belongs to the one or more PRTs.

11. The method of claim 1 wherein performing updates to the one or more PRTs includes, in response to deletion of a particular triple that is unique in the particular RDF graph set:

determining that deletion of the particular triple breaks a link in a chain represented by a particular row in a chain PRT that belongs to the one or more PRTs; and in response to determining that deletion of the particular triple breaks a link, deleting the particular row from the chain PRT.

12. The method of claim 1 wherein performing updates to the one or more PRTs includes, in response to deletion of a particular triple for which multiple instances currently exist in the particular RDF graph set, decrementing a count for the particular triple in each row of each of the one or more PRTs that includes a semantic equivalent of the particular triple.

13. The method of claim 1 wherein performing updates to the one or more PRTs includes, in response to a bulk load operation:

making the one or more PRTs invisible to a SPARQL query translator without deleting metadata for the one or more PRTs;

performing the bulk load operation while the one or more PRTs are invisible;

after the bulk load operation is completed:
truncating the one or more PRTs;
repopulating the one or more PRTs; and
making the one or more PRTs visible.

14. The method of claim 1, wherein said pattern that matches a sub-pattern of the SPARQL query is a sub-pattern of the distinct pattern associated with the particular PRT.

15. One or more non-transitory computer-readable media storing instructions which, when executed by one or more computing devices, cause:

storing, in a database, a plurality of RDF tables;

populating each table, of the plurality of RDF tables, with information that represents an RDF graph;

for a particular RDF graph set, generating and storing, in the database, one or more pre-computed result tables (PRTs);

wherein the particular RDF graph set includes the RDF graphs represented by the information in the plurality of RDF tables;

wherein each PRT of the one or more PRTs is associated with a distinct pattern;

populating each PRT of the one or more PRTs based on which information in the particular RDF graph set matches the pattern associated with the PRT;

wherein populating each PRT involves:
performing joins between two or more RDF tables of the plurality of RDF tables, and
deduplicating duplicate rows in the result of the joins due to triples that are repeated in the two or more RDF tables;

performing updates to the one or more PRTs to cause the one or more PRTs to reflect changes made by DML operations to information in the plurality of RDF tables;

receiving a SPARQL query that targets the particular RDF graph set;

identifying a particular PRT, of the one or more PRTs, that is associated with a pattern that matches a sub-pattern of the SPARQL query;

obtaining results for the sub-pattern of the SPARQL query from the particular PRT; and generating results for the SPARQL query based, at least in part, on the results for the sub-pattern of the SPARQL query obtained from the particular PRT.

16. The one or more non-transitory computer-readable media of claim 15 wherein the one or more PRTs include at least one PRT that is associated with a pattern that includes a reverse property.

17. The one or more non-transitory computer-readable media of claim 15 wherein the one or more PRTs include at least one PRT that is associated with a pattern that includes multiple instances of a particular property.

18. The one or more non-transitory computer-readable media of claim 15 wherein:

the one or more PRTs include a plurality of PRTs;

the instructions comprise instructions for identifying one or more additional PRTs, of the plurality of PRTs, that are associated with patterns that match sub-patterns of the SPARQL query; and generating results for the SPARQL query includes generating results for the SPARQL query based on information obtained from the one or more additional PRTs.

19. The one or more non-transitory computer-readable media of claim 15 wherein performing updates to the one or more PRTs includes, in response to insertion of a particular triple for which an instance already exists in the particular RDF graph set, incrementing a count for the particular triple in each row of each of the one or more PRTs that includes a semantic equivalent of the particular triple.

20. The one or more non-transitory computer-readable media of claim 15 wherein performing updates to the one or more PRTs includes, in response to deletion of a particular triple for which multiple instances currently exist in the particular RDF graph set, decrementing a count for the particular triple in each row of each of the one or more PRTs that includes a semantic equivalent of the particular triple.

21. The one or more non-transitory computer-readable media of claim 15 wherein performing updates to the one or more PRTs includes, in response to a bulk load operation:

making the one or more PRTs invisible to a SPARQL query translator without deleting metadata for the one or more PRTs;

performing the bulk load operation while the one or more PRTs are invisible;

after the bulk load operation is completed:
truncating the one or more PRTs;
repopulating the one or more PRTs; and
making the one or more PRTs visible.

22. The one or more non-transitory computer-readable media of claim 15 wherein the particular PRT is a chain PRT associated with a chain pattern.

23. The one or more non-transitory computer-readable media of claim 22 wherein the chain pattern includes one or more reverse properties.

24. The one or more non-transitory computer-readable media of claim 22 wherein the chain pattern includes multiple instances of a particular property.

25. The one or more non-transitory computer-readable media of claim 15 wherein the particular PRT is a star PRT associated with a star pattern.

26. The one or more non-transitory computer-readable media of claim 25 wherein the star pattern includes one or more reverse properties.

27. The one or more non-transitory computer-readable media of claim 14 wherein performing updates to the one or more PRTs includes, in response to insertion of a particular triple for which no instance already exists in the particular RDF graph set:
- determining that insertion of the particular triple creates a new chain that matches a chain pattern of a chain PRT that belongs to the one or more PRTs; and
- inserting a row in the chain PRT for the new chain.

28. The one or more non-transitory computer-readable media of claim 14 wherein performing updates to the one or more PRTs includes, in response to insertion of a particular triple for which no instance already exists in the particular RDF graph set:
- determining that insertion of the particular triple adds a new anchor in the particular RDF graph set; and
- inserting a row associated with the new anchor in a star PRT that belongs to the one or more PRTs.

29. The one or more non-transitory computer-readable media of claim 14, wherein said pattern that matches a sub-pattern of the SPARQL query is a sub-pattern of the distinct pattern associated with the particular PRT.

* * * * *